US008392578B1

(12) United States Patent  (10) Patent No.: US 8,392,578 B1
Donovan et al.  (45) Date of Patent: Mar. 5, 2013

(54) METHOD AND APPARATUS FOR CONTROLLING ACCESS TO A WEBSITE

(75) Inventors: Cynthia A Donovan, Lafayette, CA (US); Jimmy Jiang, Milpitas, CA (US); Siamek S Ayoubpour, San Francisco, CA (US); Wilfried Kruse, San Francisco, CA (US); Michael D McIntyre, Mill Valley, CA (US); Purna C Roy, San Francisco, CA (US); Leon M Traister, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 873 days.

(21) Appl. No.: 09/578,672

(22) Filed: May 25, 2000

Related U.S. Application Data

(60) Provisional application No. 60/181,294, filed on Feb. 9, 2000.

(51) Int. Cl.
*G06F 15/16* (2006.01)
(52) U.S. Cl. .................. 709/227; 709/228; 709/229
(58) Field of Classification Search .................. 709/224, 709/223, 227, 228, 229, 226; 705/44
See application file for complete search history.

(56) References Cited

U.S. PATENT DOCUMENTS

| | | | | |
|---|---|---|---|---|
| 5,903,721 A | * | 5/1999 | Sixtus | 726/2 |
| 6,230,196 B1 | * | 5/2001 | Guenthner et al. | 709/223 |
| 6,330,605 B1 | * | 12/2001 | Christensen et al. | 709/226 |
| 6,366,947 B1 | * | 4/2002 | Kavner | 709/203 |
| 6,606,708 B1 | * | 8/2003 | Devine et al. | 726/8 |
| 6,985,953 B1 | * | 1/2006 | Sandhu et al. | 709/229 |
| 7,082,532 B1 | * | 7/2006 | Vick et al. | 713/155 |

* cited by examiner

*Primary Examiner* — Adnan Mirza
(74) *Attorney, Agent, or Firm* — Innovation Partners; Charles Gotlieb

(57) ABSTRACT

A method and apparatus delays users from accessing a service via the world wide web in an orderly manner without maintaining a queue. When a user requests the service, if the service is busy, a web server does not allow access to the service: instead it configures the user's web browser via a script or applet to periodically retry requesting the service. A timestamp designating a time the user requested the service or other similar time is provided to the user and a count of timestamps issued in different periods are maintained by the web server. The web server periodically determines a cutoff timestamp corresponding to an available capacity of the apparatus using the count of timestamps it maintains. When the user retries requesting the service, the browser provides to the web server the timestamp it received from the server. If the timestamp provided is less than or equal to the cutoff timestamp, the user is allowed access to the service, otherwise, the users browser is instructed to retry at a specified interval.

31 Claims, 5 Drawing Sheets

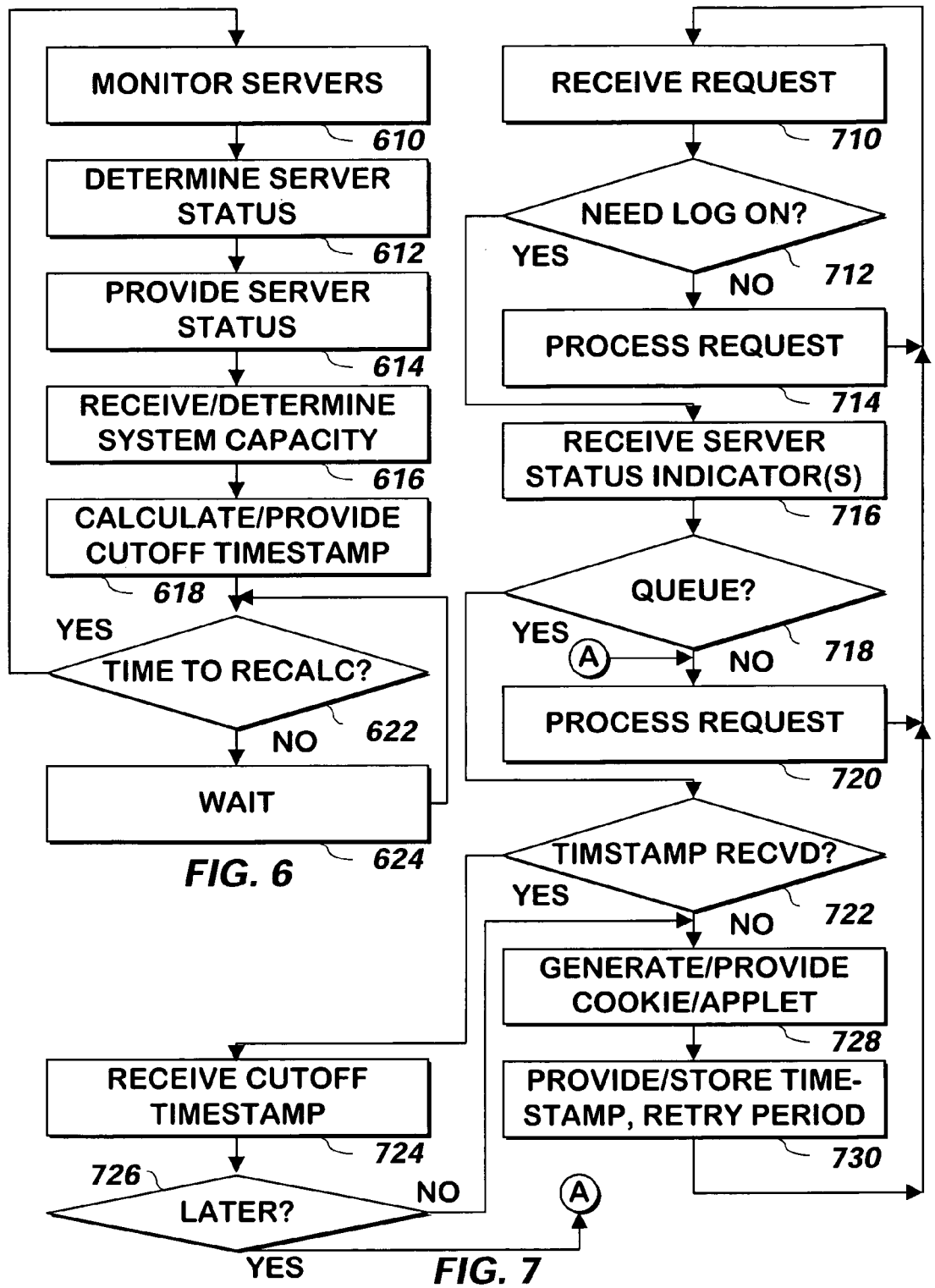

| | 810 | 812 | 814 | 816 | 818 |
|---|---|---|---|---|---|
| | ↓ | ↓ | ↓ | ↓ | ↓ |
| | PERIOD | NUMBER | END | OLD | ABND |
| | 0:00:00-0:00:30 | 00 | 0:05:33 | 42 | 2 |
| | 0:00:30-0:01:00 | 00 | 0:06:03 | 65 | 4 |
| | 0:01:00-0:01:30 | 00 | 0:06:33 | 47 | 7 |
| | 0:01:30-0:02:00 | 51 | 0:02:00 | -- | -- |
*FIG. 8*
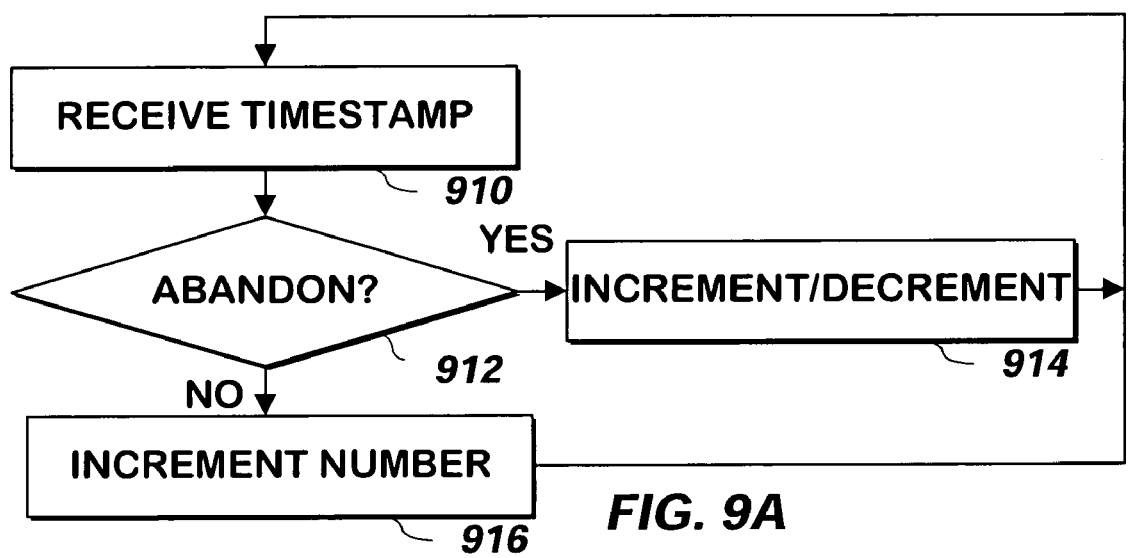
*FIG. 9A*
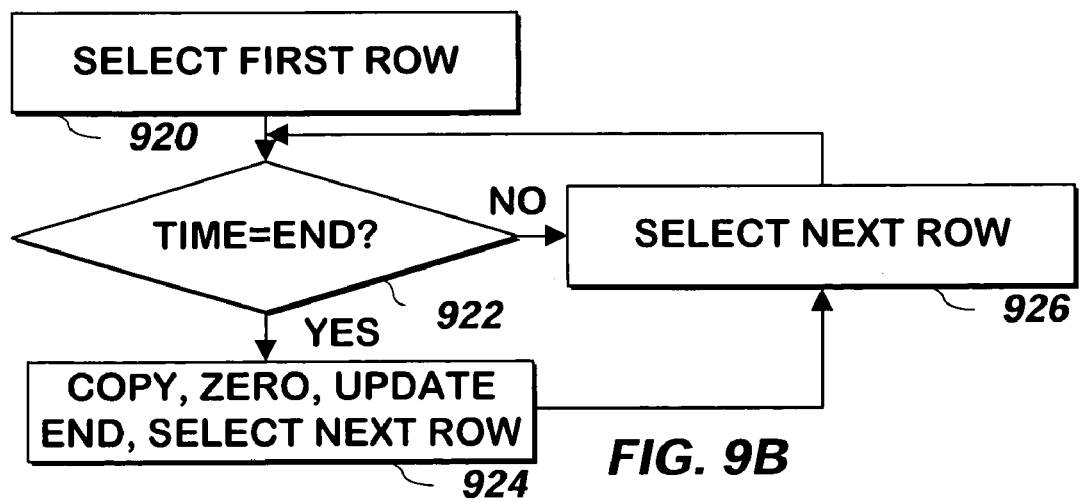
*FIG. 9B*

METHOD AND APPARATUS FOR CONTROLLING ACCESS TO A WEBSITE

RELATED APPLICATIONS

This application claims the benefit of U.S. Provisional Application No. 60/181,294 entitled, "Method and Apparatus for Controlling Access to a WebSite" filed Feb. 9, 2000 by Cynthia Donovan and is hereby incorporated herein by reference in its entirety.

The subject matter of this application is related to the subject matter of application Ser. No. 09/425,748 entitled, "System and method for Identifying the Workload Queued by a Monitor" filed on Oct. 22, 1999 by Jean-Jaques Heller having the same assignee as this application and is incorporated herein by reference in its entirety.

FIELD OF THE INVENTION

The present invention is related to computer software and more specifically to Internet computer software.

BACKGROUND OF THE INVENTION

Many sites on the World Wide Web have capacity to handle large numbers of simultaneous users. However, every web site has a finite capacity for a given level of service. When this capacity is exceeded, the web site may operate below the level of service, or may stop operating at all.

If it is desirable to maintain the level of service of a web site, it may be desirable to delay or deny additional users access to the web site when the site is operating at or near capacity. Although the users who are delayed or denied access to the web site may be frustrated that they do not have access, the level of service is maintained for those who have access.

When a conventional site delays access to users, users are granted access to the site when capacity becomes available. Typically, capacity becomes available when a user using the site leaves the site. Shortly after a user leaves the site, another user who happens to attempt to gain entry at that moment is granted access to the site.

There are several problems with this approach. First, it does not operate fairly. Gaining access to such a web site is a chance occurrence. The users who have been waiting the longest do not stand a greater probability of gaining access to such a web site than other users who may gain access on their first attempt.

The second problem is related to the first one. Because users realize that the probability of gaining access to the web site is higher as the number of access attempts they make increases, users will repeatedly attempt to access the site. The repeated access attempts can increase the load on the web server, which may further reduce the capacity of the system, or even bring the system down.

Solutions to this problem have been elusive. One reason that solutions to this problem are elusive is caused by the architecture of conventional web sites. Conventional web sites are made scalable using a "server farm" containing multiple servers. Each server in the server farm handles a subset of the total number of users to the site. These servers operate somewhat independently of one another to build and format web pages and receive information from the users. Although each web server may access a central database to provide some of the information in the web pages they build, much of the work may be handled by each web server independently of the others. This architecture makes it difficult to place users in a conventional queue because a central database would be needed to maintain the queue. If the site can receive a large amount of traffic during peak periods, the additional investment in equipment and software required to implement and manage the central queue can be substantial.

A queue is particularly inefficient for a web site because many users may abandon their attempt to access a web site if they have to wait for access. A place in a conventional queue must be maintained even for users who abandon their attempt at access, or the connection between the web server and the user must be maintained to allow for detection of an abandoned attempt. Either alternative can be an inefficient use of resources.

What is needed is a method and apparatus that can provide access to a web site in a fair manner that does not reward repeated attempts, does not require a queue and adjusts for any rate of abandonment of user attempts.

SUMMARY OF INVENTION

When a method and apparatus receives a request for a web page, a timestamp, designating the time the user made the request, is supplied with one or more commands to rerequest the page. The commands may be in the form of a program, applet or script that will cause the browser that made the original request to send one or more periodic rerequests for the web page. The method and apparatus maintains a list of the number of waiting users who have received timestamps and did not miss rerequesting the web page at approximately a time the user was expected to rerequest it. The method and apparatus periodically calculates or receives a capacity of additional users who may be allowed to access the web page. The method and apparatus periodically scans the list of waiting users until it identifies a "cutoff" timestamp for which the number of users issued a timestamp prior to the cutoff timestamp is approximately equal to the available capacity of the system. When a user rerequests access to the web site, the method and apparatus receives or retrieves the timestamp issued to the user in response to the user's original request. If the timestamp received with, or retrieved following, the rerequest is not later than the cutoff timestamp, the user is provided access to the web page. Browsers sending rerequests for which the timestamp is later than the cutoff timestamp will send additional rerequests until the timestamp is not later than the cutoff timestamp, which is periodically advanced forward as additional capacity becomes available.

Because the timestamp is used to gate access, no central queue need be maintained. Because access is granted based on the time the first request was made, repeated attempts to gain access to the web page do not help a user access the web page any faster, reducing the incentive for the user to make repeated attempts.

BRIEF DESCRIPTION OF THE DRAWINGS

FIG. 6 is a flowchart illustrating a method of providing server status and a cutoff timestamp according to one embodiment of the present invention.

FIG. 7 is a flowchart illustrating a method of delaying access to a user requesting service from one or more servers according to one embodiment of the present invention.

FIG. 8 is a schematic diagram of a table stored in stroke-count storage of FIG. 5 according to one embodiment of the present invention.

FIG. 9A is a flowchart illustrating a method of recording numbers of users waiting for access to a portion of a web site according to one embodiment of the present invention.

FIG. 9B is a flowchart illustrating a method of processing the numbers of users waiting to access a website of FIG. 9B according to one embodiment of the present invention.

DETAILED DESCRIPTION OF A PREFERRED EMBODIMENT

Figure 1:
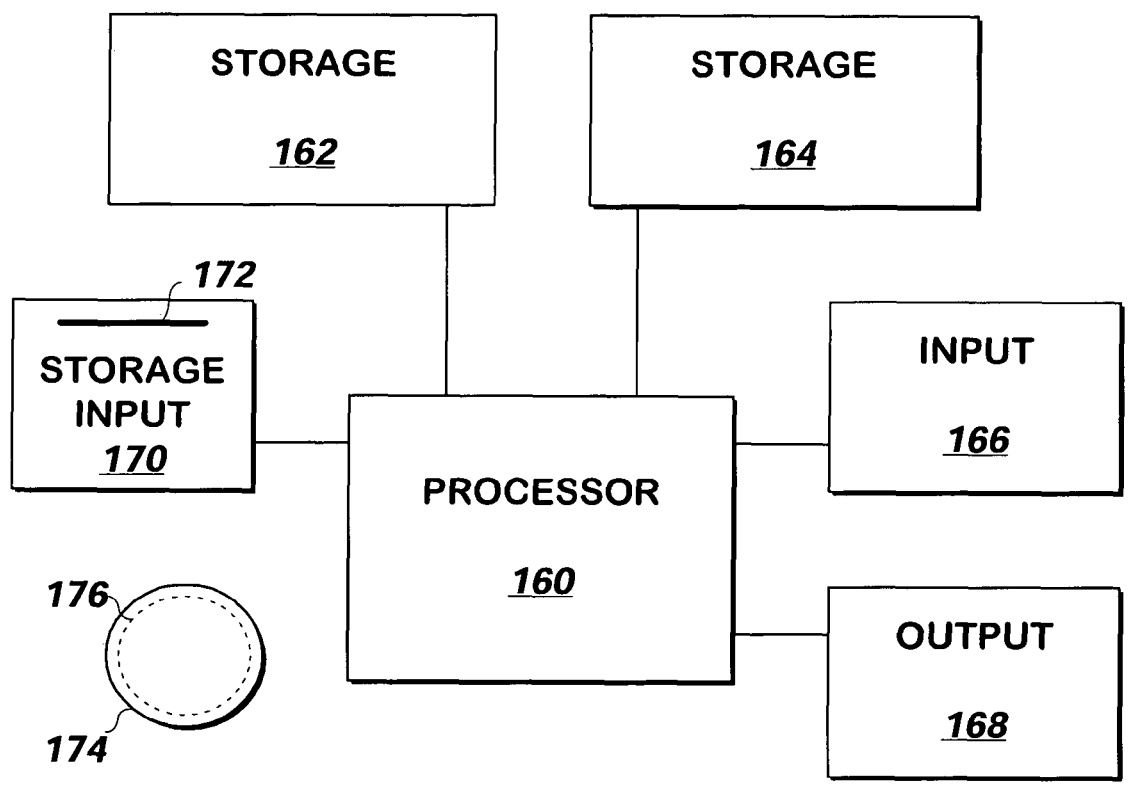
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., although other systems may be used.

Figure 2:
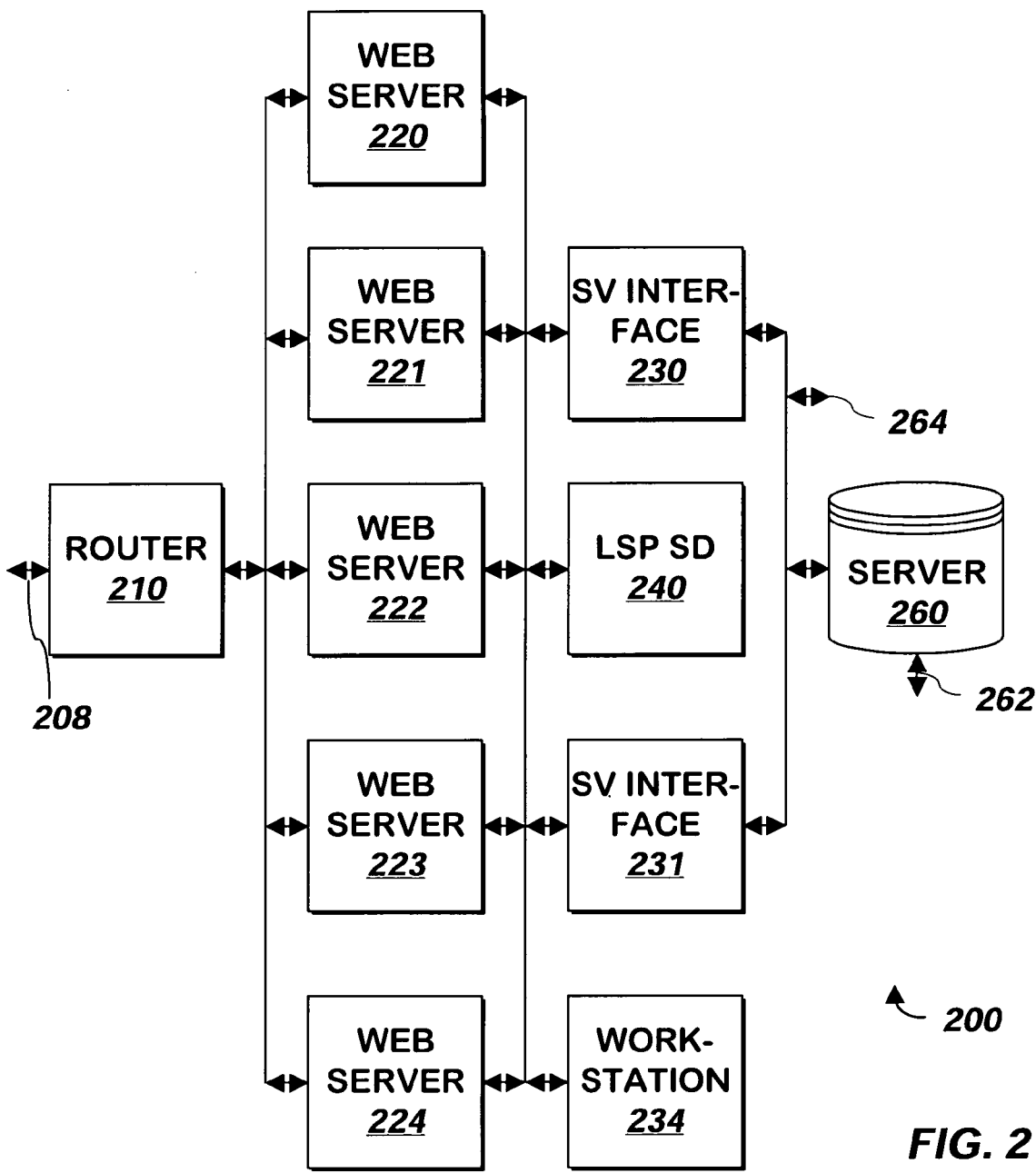
FIG. 2 is a block schematic diagram of a system for providing web pages according to one embodiment of the present invention.

Referring now to FIG. 2, a system 200 for providing web pages is shown according to one embodiment of the present invention. Router 210 includes a conventional router and distribution software to distribute among web servers 220-224 requests received at input/output 208, coupled to the Internet or an intranet, for access to one or more web pages. Web servers 220-224 are conventional web servers, with additions as noted below. Web servers 220-224 process requests from users, which may involve access to a central server 260. The central server 260 may be a conventional mainframe computer system or a group of servers, any of which may include a conventional database.

Web servers 220-224 request and receive data used to build the web pages they serve from server 260 via server interfaces 230, 231. In one embodiment, all the data needed by web servers 220-224 is on server 260 and in another embodiment, data may be obtained from several sources (not shown) in addition to server 260. In such case, in one embodiment, web servers 220-224 are provided access to the data that does not reside on server 260 via server 260 which has connections 262 to the other sources of data. In another embodiment, web servers 220-224 access the data directly via connections 264 to other servers (not shown). Server interfaces 230, 231 can convert requests received from web servers 220-224 into a format suitable for server 260 and provide the formatted request to the server 260. Server interfaces 230, 231 receive the response from the server 260 and may convert the response into a format suitable for use by the web servers 220-224 and provide the formatted response to the web servers 220-224. In one embodiment, server interfaces 230, 231 may perform buffering, queuing and other functions as well.

As shown in the Figure, there are five web servers 220-224, two server interfaces 230, 231 and one server 260 although any number of these may be used according to the present invention. In another embodiment (not shown), there are 45 web servers and 9 server interfaces.

LSP status daemon 240 periodically tests each server interface 230, 231 to identify its status. In one embodiment, LSP status daemon 240 tests the status of each server interface 230, 231 by sending one or more requests for service and investigating any response received from that server interface 230, 231. LSP status daemon 240 then identifies the status of the server interface 230, 231. In one embodiment, a "Y" status indicates the server interface 230 or 231 is running and available, a status of "N" indicates the server interface 230 or 231 is not available for reasons other than serving as an interface (e.g. it is not operating or running a maintenance procedure) and a status of "Q" indicates the server interface 230 or 231 is operational but busy performing server interface functions for a web server 220-224 as described above.

If the LSP status daemon 240 does not receive a response from server interface 230, 231 after a certain number of attempts such as three attempts, the responses are not received within a certain time, or the responses are error messages or messages indicating the server interface 230, 231 is busy processing other requests, the LSP status daemon 240 internally records the server interface 230 or 231 as having a status equal to "Q" indicating the server interface 230, 231 has no available capacity. If a response is received or received within an acceptable time, LSP status daemon 240 marks the server interface 230 or 231 as having a status equal to "Y" indicating the server interface 230, 231 has available capacity.

LSP status daemon 240 thus uses the status of each of the server interfaces 230, 231 as a proxy to identify available capacity of the server 260 in the embodiment described above. However, in other embodiments, other identifiers of the status of the server interfaces 230, 231 such as performance/utilization statistics can be used, and in still another embodiment, the server 260 can be investigated directly using techniques similar to those described above for the server interfaces 230, 231 (e.g. performing a test that can fail to show the server 260 is busy or requesting performance/utilization statistics).

In one embodiment, the status in LSP status daemon 240 of a server interface 230 or 231 may be manually adjusted to a value of "Y" or "Q" or "N". Such a manual status adjustment may be made using the conventional keyboard and mouse of conventional workstation 234. If the status in LSP status daemon 240 of a server interface 230, 231 is manually adjusted to "N", LSP status daemon 240 will not test that server interface 230, 231 as described above until the status for that server interface 230, 231 is manually adjusted back to "Y" or "Q".

Figure 3:
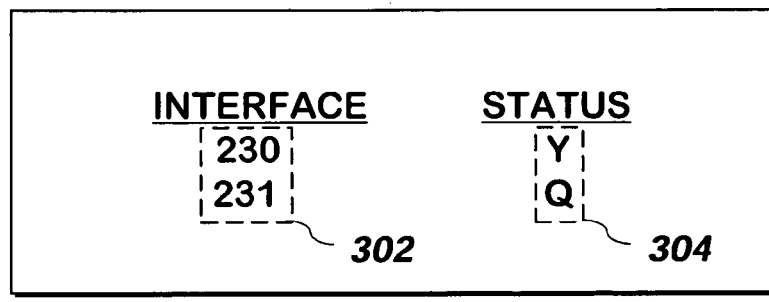
FIG. 3 is an illustration of an LSP status daemon file according to one embodiment of the present invention.

LSP status daemon 240 periodically builds and maintains a file called the LSP status daemon file which provides an indication of the status of each server interface 230, 231 obtained as described above. Referring momentarily to FIG. 3, an illustration of an LSP status daemon file 300 is shown according to one embodiment of the present invention. The file 300 contains an identifier 302 of each server interface 230, 231 and an indication 304 of the status ("Y", "Q" or "N") of the server interface 230, 231 as described above.

Referring again to FIG. 2, LSP status daemon 240 holds the LSP status daemon file in storage such as conventional memory or disk storage, and makes the file available to web servers 220-224. In one embodiment, the file is stored in LSP status daemon 240, and web servers 220-224 can read or request from LSP status daemon 240 the file or portions of the file for use as described below. In another embodiment, LSP status daemon 240 periodically provides to web servers 220-224 copies of some or all of the LSP status daemon file for use as described below.

Figure 4:
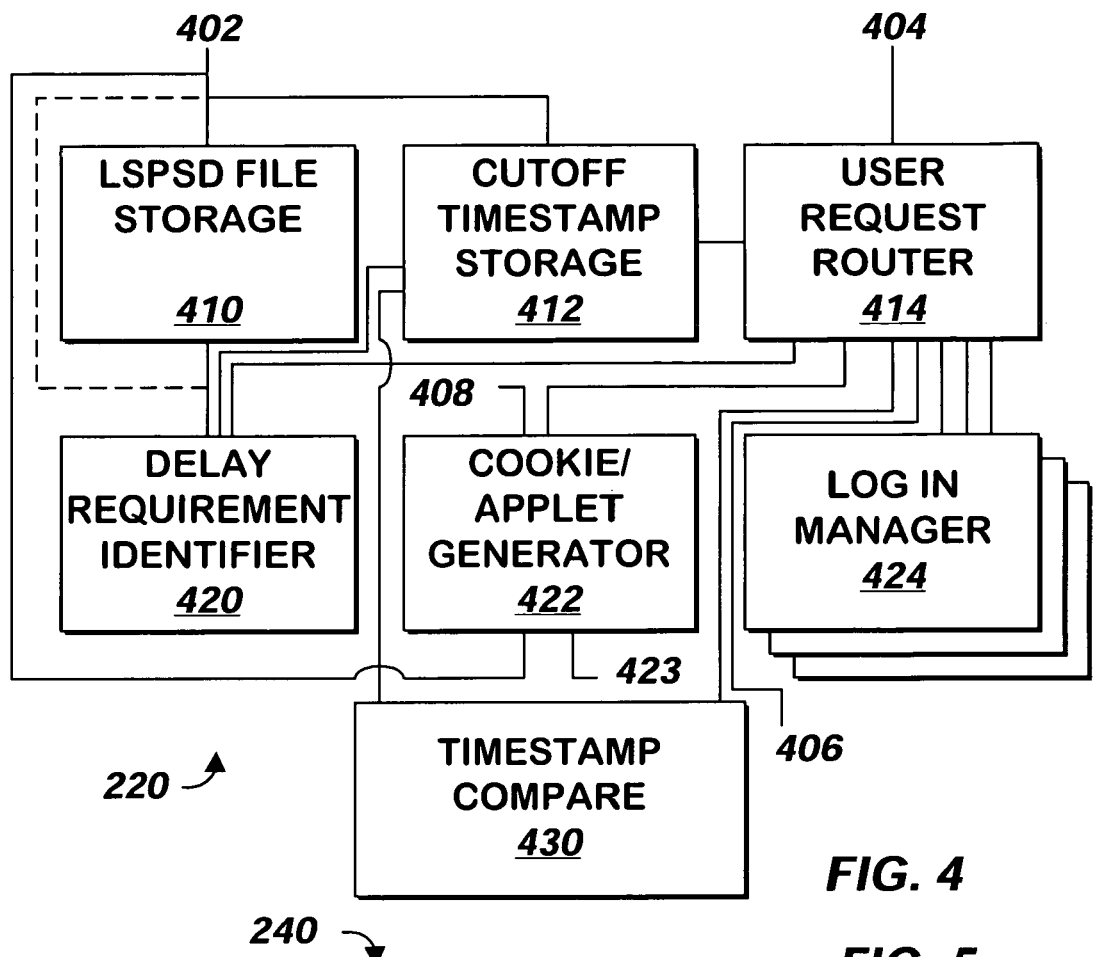
FIG. 4 is a block schematic diagram of a web server according to one embodiment of the present invention.

Referring now to FIGS. 2 and 4, an example one 220 of the web servers 220-224 is shown according to one embodiment of the present invention. Input/output 402 is coupled to LSP status daemon 240 and receives the LSP status daemon file and other information as described below. The LSP status daemon file is received and stored in LSP status daemon file storage 410 in the embodiment in which the file is provided to and stored on the web servers 220-224. LSP status daemon file storage 410 may include conventional memory or disk storage. The LSP status daemon 240 also provides at input/output 402 a cutoff timestamp, generated and used as described below. The cutoff timestamp is received and stored by cutoff timestamp storage 412, which may include conventional memory or disk storage.

Delay requirement identifier 420 reads the cutoff timestamp from cutoff timestamp storage 412 and determines if queuing is necessary. In one embodiment, delay requirement identifier 420 reads the cutoff timestamp when requested by user request router 414 as described below. In one embodiment, if delay requirement identifier 420 identifies if delaying access is necessary, delay requirement identifier 420 signals stroke counter 532 of FIG. 5 as described below via input/output 402.

In one embodiment, if the cutoff timestamp has a special value, such as a negative value, or a value of 00:01, delay requirement identifier 420 will indicate that delaying user's access is not required. Otherwise, delay requirement identifier 420 will indicate that delaying access is required as described below.

Users wishing to access the capabilities of the system 200 access the system 200 via input/output 404 coupled to user request router 414 and router 210. When a user provides a request for a page not requiring a log in or other information from server 260, the page is served to the user by user request router 414.

As used herein, a log in page is used as a gate to other pages that may require the server interfaces 230, 231. Until the user gains access to the log in page, other types of access to the server interfaces 230, 231 may be limited or denied. However, other types of pages may be used as the gate, or no gate may be used at all as described below.

If the user requests at input/output 404 a page requiring a log in, user request router 414 requests the delay requirement from delay requirement identifier 420. Delay requirement identifier 420 determines and indicates whether delaying access is required as described above. If delaying access is not required, user request router 414 routes the user to log in manager 424, which processes the log in request and subsequent requests until the user logs out of the system, is disconnected, or connects to a page that does not require the use of log in manager 424.

If delaying access is required, user request router 414 will determine whether a timestamp is available from the user. A timestamp is available if the user had made an earlier request and that request was denied and the user did not abandon the request as described below. The timestamp, described in more detail below, identifies the time the user first tried to access the log in manager 424 but was denied. There are many ways of determining whether such a timestamp is available. In one embodiment, the user's timestamp is stored as a cookie on his computer system as described in more detail below. User request router 414 sends a conventional command to retrieve the cookie (e.g. @cookies=split in perl, or document.cookie.split in Javascript or another similar command to retrieve a cookie) to request the cookie containing the timestamp. In another embodiment, the timestamp, if available as described below, is provided by the user's browser with the request that requires the use of the log in manager 424 via conventional CGI techniques.

If a timestamp is not available, the user is attempting to access log in manager 424 on a basis other than retrying after a delay as described below. User request router 414 signals cookie/applet generator 422. Cookie/applet generator 422 requests via input/output 408 coupled to operating system (not shown) the time or the time and date from the system clock. Cookie/applet generator 422 receives the time or the date and time at input 408. In one embodiment, cookie/applet generator 422 generates a cookie containing the system time or the date and time and stores it on the user's system via user request router 414 and input/output 404 using conventional CGI or Javascript scripting techniques or other similar techniques. Cookie/applet generator 422 also generates a program to be run on the user's system that will resend the request requiring the log in manager 424. The program may cause the request to be resent only once or periodically until the request is successful or the user abandons the request until the request is successful or the user abandons the request. The period which the user's system waits to resend the request is referred to as the "retry period". The program may be a Java applet, Javascript script or other similar program that is capable of operation by a browser or otherwise.

In another embodiment, the timestamp is not sent separately to the user as a cookie. Instead, the timestamp is embedded in the applet or script and so no cookie is provided by cookie/applet generator 422. Cookie/applet generator 422 sends the applet, and optionally the cookie, to user request router 414, which sends the applet and optionally the cookie to the user as a web page or a web page and a cookie via input/output 404. The user's browser running the script or applet returns the timestamp and optionally, the retry period it received, to user request router 414 with all subsequent requests it makes until the applet or script is halted by the user or the request is successful as described below.

In one embodiment, cookie/applet generator 422 sends a retry period that is static. All cookies and/or applets it generates have the same retry period, such as 30 seconds. In another embodiment, cookie/applet generator 422 receives at input 423 from retry period calculator 530, described below, the retry period it should send to the user via input/output 402.

The applet or script will cause the user's conventional browser such as the conventional Internet Explorer Browser commercially available from Microsoft Corporation of Redmond, Wash., running on a conventional computer system (not shown) such as a conventional Pentium compatible computer system available from Dell Computer Corporation of Round Rock, Tex., to delay for the retry period and then generate another request to the user request router 414 that will require the log in manager 424 unless the user stops the operation of the script or applet making additional requests. The applet or script may send the timestamp and optionally the retry period, with this request as noted above. The applet or script may also perform other useful functions, such as displaying to the user a message indicating that he or she has been queued or otherwise delayed and will get served as capacity is available.

If, when the user makes the request, the timestamp is available, either from the request or from a cookie, user request router 414 sends the timestamp to timestamp compare 430. Timestamp compare 430 compares the timestamp it receives from user request router 414 with the timestamp in cutoff timestamp storage 412 to determine if the timestamp received from user request router 414 is earlier than the timestamp in cutoff timestamp storage 412. If it is earlier, timestamp compare 430 signals user request router 414, which sends the user's request to log in manager 424 for processing, and may send an indication via input/output 404 to the script or applet retrying that the retry attempt has succeeded. If the timestamp is not earlier, timestamp compare 430 signals user request router 414 that this is the case. User request router 414 provides the timestamp received to cookie applet generator 422. Cookie/applet generator 422 generates another applet with the original timestamp in one embodiment, or in another embodiment sends an indication back to the user leaving the original applet on the user's system to retry using the timestamp. The same or a different retry period may also be provided by cookie applet generator 422 allowing the retry period to change for each retry. For example, if the retry period is calculated according to how close the timestamp is to the cutoff timestamp as described below, the user's browser may receive a different retry period than was used before.

If a different retry period will be sent, cookie/applet generator 422 requests and receives a new retry period from LSP status daemon 240 via input/output 402 as described below. In one embodiment, the timestamp for which the retry period is being requested is provided to LSP status daemon 240 with the request for the new retry period.

In one embodiment, cookie/applet generator 422 maintains the number of retries that have been attempted. This is performed by sending as part of the cookie or applet the number of retries attempted and receiving this number from the user with each retry. The number is originally set to 0 when the first attempt to log in is performed. Each time the number of retries is received or retrieved as part of the cookie by cookie/applet generator 422, the number of retries is incremented and returned to the user to be provided with the next retry.

Each time the timestamp is sent to a user, cookie/applet generator 422 sends via input/output 402 to stroke counter 532 for use as described below the timestamp it receives or, in the case in which no timestamp was received, the timestamp it generates.

When a user's request is sent to log in manager 424, log in manager 424 handles the log in procedure in conjunction with user request router 414. User request router 414 is coupled via input/output 406 to server interfaces 230, 231 of FIG. 2 to provide requests to, and retrieve information from, server 260 of FIG. 2 as described above. In one embodiment, there may be multiple log in managers for each web server as shown in FIG. 4.

Figure 5:
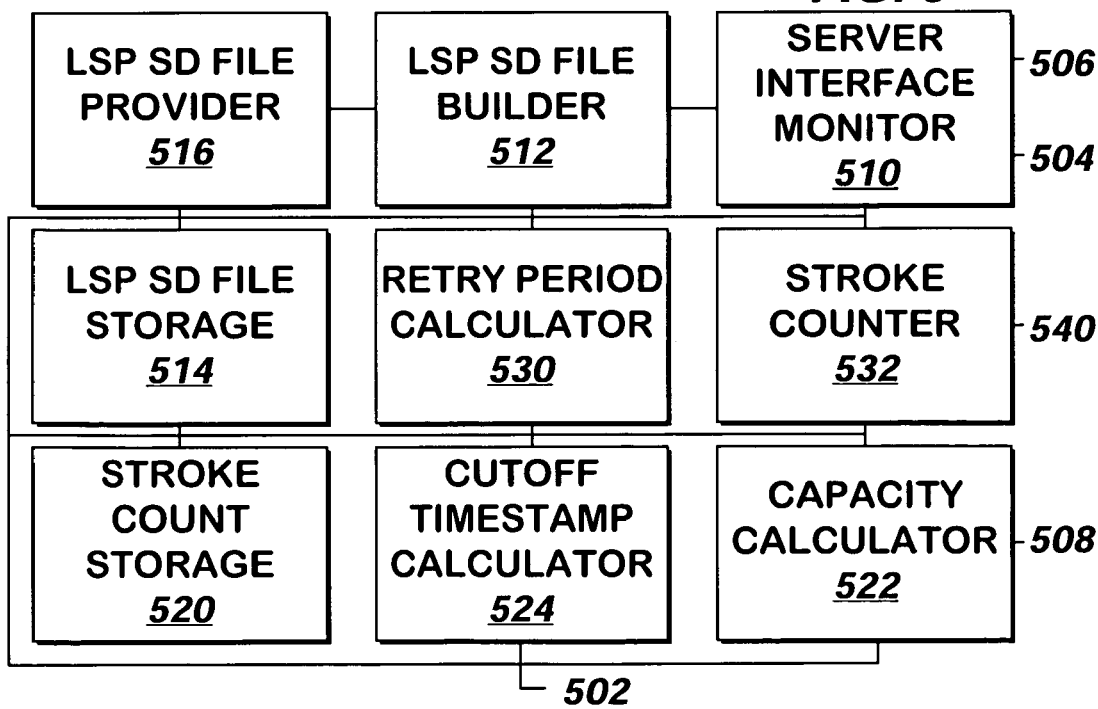
FIG. 5 is a block schematic diagram of an LSP status daemon according to one embodiment of the present invention.

Referring now to FIGS. 2 and 5, an LSP status daemon 240 is shown according to one embodiment of the present invention. Among the functions performed by LSP status daemon 240 is the building of the LSP status daemon file, the calculation of the cutoff timestamp and calculation of retry periods if the retry periods are variable. Each of these will now be described.

Server interface monitor 510 maintains a list of each server interface 230, 231 in the system 200. To create the LSP status daemon file, server interface monitor 510 monitors the server interfaces 230, 231 by periodically sending via input/output 504 coupled to each server interface 230, 231 a request to perform work. If the request causes server interface 230 or 231 to return an error via input/output 504, or if the request is not performed or is not performed within a specific period after the request is sent, server interface monitor 510 marks that server interface as busy as described above. In one embodiment, three consecutive failed (e.g. error message is returned, not performed or not performed within a specific time) attempts are made before a server interface 230 or 231 is marked as busy. The server interface 230 or 231 is marked as busy by inserting a "Q" associated with that server in the list of server interfaces 230, 231 server interface monitor 510 maintains. If the request is answered at input/output 504, server interface monitor 510 inserts a "Y" associated with that server interface 230, 231 in its list to indicate the server is available.

If server interface monitor 510 receives at input 506, which is coupled to a conventional input device such as a keyboard and mouse, an indication that server interface monitor 510 should consider a specified server interface to be up, busy or down, server interface monitor 510 provides a status of "Y", "Q", or "N", respectively associated with the specified server interface in the list it maintains.

Periodically, such as every 30 seconds, when server interface monitor 510 updates its list, it signals LSP status daemon file builder 512.

LSP status daemon file builder 512 retrieves the list from server interface monitor 510 along with the status of "Y", "Q" or "N" for each server interface 230, 231 when signaled by server interface monitor 510. LSP status daemon file builder 512 builds the LSP status daemon file described above using the list it retrieves and stores it into LSP status daemon file storage 514 which may be conventional memory or disk storage. When it is finished storing the file, LSP status daemon file builder 512 signals LSP status daemon file provider 516, cutoff timestamp calculator 524 and capacity calculator 522.

In one embodiment, LSP status daemon file provider 516 provides to each web server 220-224 via input/output 502, coupled to input output 402 of FIG. 4 the LSP status daemon file in LSP status daemon file storage 514 when it is signaled by LSP status file builder 512. In another embodiment, LSP status daemon file storage 514 is connected to input/output 502 to allow each web server 220-224 to retrieve the LSP status daemon file directly. In such embodiment, LSP status daemon file provider 516 need not be used.

Stroke counter 532 receives the timestamps provided as described above by cookie/applet generator 422 of FIG. 4. In one embodiment, for each thirty second period from the time that delay requirement identifier 420 identifies that delaying access is required, stroke counter 532 maintains in strokecount storage 520 a table of thirty second periods and the number of users having timestamps that were issued in the thirty second period and are potentially waiting to retry. Each time a timestamp is received by stroke counter 532, it updates the table. In other embodiments, stroke counter maintains the table for all thirty second periods in one or more days.

Referring momentarily to FIG. 8, a table maintained by stroke counter 532 of FIG. 5 is shown according to one embodiment of the present invention. Column 810 holds an identifier of a thirty second period. Column 812 holds the number of timestamps issued or retries attempted for users holding a timestamp in the period of column 810 that have not been swept into column 816 as described below. Column 814 holds the end of the period in which the last timestamp for the period is expected to be issued or the last user holding such a timestamp is expected to retry. Column 816 is a holding column in which the numbers from column 812 are swept at or after the time specified in column 814. The table illustrated in FIG. 8 shows only four rows, although one row for each thirty second period in a day or longer may exist in the table in one embodiment.

Referring now to FIGS. 5 and 8, stroke counter 532 maintains the table of FIG. 8 as follows: as stroke counter 532 receives a timestamp, it increments the number in column 812 in the row corresponding to the timestamp. Stroke counter 532 periodically checks the system clock, and compares the system clock with the time in column 814. When the system clock exceeds that time, stroke counter copies the number in column 812 of a row into column 816 of the same row, and clears the number in column 812 in that row to zero. Stroke counter then adds the retry period to the time in column 814 of the same row and stores the result in column 814 of that row. In one embodiment, instead of merely adding the retry period, to column 814 as described above, a few extra seconds are also added to allow for modem or other delays.

This approach allows two numbers to be maintained for each thirty second period: a working copy in column 810 that is capable of being incremented as timestamps are received in a current "batch", and a fixed number of retries that were received during a prior "batch". In the example shown in FIG. 8, the system clock is at 00:01:50, so the number in column 812 of each of the first three rows has been swept to column 816 and the number in column 812 of the fourth row has not, because the system clock has not exceeded 0:02:00. When the system clock exceeds 0:02:00, stroke counter 524 will copy the value in column 812 of the last row of the table in FIG. 8 to column 816 of the same row.

In one embodiment, prior to sweeping the number from column 812 of a row to column 816 of that row, stroke counter 532 outputs to a log file via input/output 540 the number in column 816 (and optionally the number in column 818 described below) so that statistical information may be maintained.

It is not strictly necessary for the ending column 814 to be maintained as described above, as it can be calculated from the timestamp column 810 based on the current time available from the system clock.

Referring now to FIGS. 4, 5 and 8, in one embodiment, the applet that is provided to the user contains a button to allow the user to explicitly abandon waiting for access to the portion of the site that is controlled by log in manager 424. If the button is pressed, the applet sends to user request router 414 the timestamp along with a notice that it is abandoning the attempt before the applet terminates. In one embodiment, user request router 414 forwards the timestamp and the notice to cookie/applet generator 422 which forwards the timestamp and notice to stroke counter 532.

In one embodiment, stroke counter 532 increments a counter in a separate column 818 describing the number of abandonment requests in the table for the row corresponding to the timestamp it receives. The column is periodically exported by stroke counter 532 via output 540 for statistical reporting as described above, then reset to zero. In one embodiment, the number in column 816 of the row corresponding to the timestamp received is decremented to indicate that one less additional user is waiting.

In one embodiment, the applet maintains the time it last attempted to access the system and sends the difference between that time and the time of the abandonment request with the express abandonment attempt. The difference is forwarded to stroke counter 532 along with the abandonment notice. If the difference is less than about 32 seconds, stroke counter 532 will assume the number in column 812 of the table in the row corresponding to the timestamp it receives has been incremented for that user and so stroke counter 532 decrements the number in column 812 in the row corresponding to the timestamp it receives in addition to decrementing the number in column 816 as described above.

In one embodiment, capacity calculator 522 determines the available capacity of the system using the LSP status daemon file stored in LSP status daemon file storage 514. Capacity calculator 522 determines the available capacity based on the number or percentage of server interfaces 230, 231 that are listed in the LSP status daemon file as being available or using other information in the file. For example, each server interface 230, 231 may be determined to have available capacity of 200 users if the server interface has a 'Y' status, and if both server interfaces are listed with a 'Y' status in the LSP status daemon file, capacity calculator identifies the available capacity of the system as 400 users. In one embodiment, the capacity of a system with a 'Y' status is the number of users that such a server interface 230, 231 could handle if no users were using that server interface 230, 231. Capacity calculator 522 calculates the number of additional users for which the system has available capacity and provides this number to cutoff timestamp calculator 524.

In one embodiment, capacity calculator 522 adjusts its calculations of available capacity by watching the results of operation of the apparatus of the present invention. If a certain percentage of server interfaces 230, 231 continue to have 'Y' status, capacity calculator will increase the estimated available capacity of each 'Y' status server interface 230, 231. If another percentage of server interfaces 230, 231 have 'N' status, capacity calculator will decrease the estimated available capacity of each 'Y' status server interface 230, 231. In another embodiment, the capacity of each available server interface 230, 231 is calculated by multiplying the total capacity of each server interface by the ratio of server interfaces 230, 231 available to the number of server interfaces available and busy, in order to identify the capacity of a each available server interface.

In another embodiment, capacity calculator 522 receives an indication of the system capacity at input 508, and performs any necessary calculations to convert the indication into a number of users. The indication may be generated using the apparatus described in the copending application or using any other method. In still another embodiment, capacity calculator 522 obtains the raw data that is used to generate the LSP status daemon file and uses that data instead of the file to determine the number of available server interfaces 230, 231.

When signaled by LSP status daemon file builder 512, cutoff timestamp calculator 524 calculates a new cutoff timestamp if system capacity allows it. In one embodiment, to calculate the new cutoff timestamp, cutoff timestamp calculator 524 uses the former cutoff timestamp (which it maintains internally), the system clock, the capacity of the system which it requests from capacity calculator 522 and the table in stroke count storage 520. If capacity calculator 520 indicates that additional capacity exists in the system, timestamp calculator selects each row in the table beginning with the row following the row corresponding to the former cutoff timestamp and sums the entries in the table in stroke count storage 520 in column 816 shown in FIG. 8 until the sum exceeds the capacity of the system received from capacity calculator 522 or the indicator of the thirty second period in row 810 from the selected row indicates a time that is ahead of the system clock. If the selected row is ahead of the system clock, cutoff timestamp calculator 524 indicates that delaying access is not required as described above, using a special cutoff timestamp. Cutoff timestamp calculator 524 signals stroke counter 532, which exports via output 540 the remaining statistics from the table in stroke count storage 520 and clears the entries in columns 812-818 of the table.

Otherwise, cutoff timestamp calculator 524 selects a cutoff timestamp that corresponds to the end of the thirty second period identified by column 810 of the selected row in on embodiment or the prior selected row in another embodiment. In another embodiment, cutoff timestamp calculator selects from these two cutoff timestamps using the one that provides a sum nearest to the capacity of the system. In another embodiment, cutoff timestamp calculator 524 selects a cutoff timestamp that may be between the end of two thirty second periods by subtracting from the end of the thirty second period identified by column 810 of the selected row 30 seconds multiplied by the difference of the sum of the number of users computed as described above subtracted from the capacity of the system.

If the last cutoff timestamp cutoff timestamp calculator 524 provided indicated delaying access was not required, the next time it is signaled by LSP status daemon file builder 512, cutoff timestamp calculator 524 reads from LSP status daemon file storage 514 the LSP status daemon file to determine if delaying access should be required. In one embodiment, delaying access is required if the ratio of server interfaces with a "Y" status to server interfaces with "Y" or "Q" status is less than a threshold, such as 50 percent. In such embodiment, cutoff timestamp calculator 524 indicates that delaying access is required by setting the cutoff timestamp.

Referring now to FIG. 5, retry period calculator 530 may be used to calculate different retry periods in selected embodiments of the present invention. There are many ways a variable retry rate may be calculated.

In one embodiment, the retry rate is calculated shorter for a group of users who are waiting to retry with timestamps immediately after the cutoff timestamp than for other users. The group is made up of a number of users approximately equal to the capacity of the system that have timestamps after the cutoff timestamp and who are "next in line" to gain access to the web site. This way, even if the most extreme scenario occurred and all of the existing users on the web site logged out simultaneously, there would be a rapid supply of users retrying to use the newly available capacity of the web site.

In such embodiment, retry period calculator 530 receives the cutoff timestamp from cutoff timestamp calculator 524 each time a new cutoff timestamp is recalculated, and requests and receives the system capacity from capacity calculator 522, or calculates the system capacity in a manner similar to that described for capacity calculator 522 above, each time a new timestamp is received. Capacity calculator 522 identifies a shadow cutoff timestamp by summing the number of users in stroke count storage 520 beginning from the thirty second period corresponding to the cutoff timestamp received from cutoff timestamp calculator 524 until the sum of the number of users exceeds the capacity of the system. Retry period calculator 530 then identifies the end of this period as the shadow cutoff timestamp. (Times other than the end of the thirty second periods, such as those identified through interpolation described above with respect to cutoff timestamp calculator 524 may also be used.) Cookie/applet generator 422 will request a retry period from retry period calculator 530 by providing the timestamp of the user retrying. If the timestamp corresponding to the request is earlier than or equal to the shadow cutoff timestamp, retry period calculator 530 provides a short retry period such as one second. If the timestamp is after the shadow cutoff timestamp, retry period calculator 530 will provide a larger retry period such as thirty seconds. In one embodiment, retry period calculator 530 provides to cookie/applet generator 422 the shadow cutoff timestamp so that cookie/applet generator 422 does not have to request it for each user retrying. Cutoff timestamp calculator 524 provides recalculates the shadow cutoff timestamp (and optionally provides it to cookie/applet generator 422) each time a new cutoff timestamp is received from cutoff timestamp calculator 524.

In one embodiment, rather than using the actual capacity of the system at the time the shadow cutoff timestamp is calculated, retry period calculator 530 uses the theoretical maximum capacity of the system in place of the actual capacity of the system as described above. The theoretical maximum capacity of the system is the capacity of the system that would be available if all server interfaces that were in the Y or Q state in one embodiment, or in the Y, Q, or N state in another embodiment, were all in the Y state. Retry period calculator 530 retrieves the number of server interfaces by retrieving the LSP status daemon file in LSP status daemon file storage 514.

There are other ways of calculating a variable retry period. In one embodiment, retry period calculator 530 provides a retry period based on the difference between the cutoff timestamp and the timestamp for which the retry period is being issued. In such embodiment, cutoff timestamp calculator 524 provides the cutoff timestamp to retry period calculator 530 when it provides it at input/output 502 as described above. Retry period calculator 530 receives from cookie/applet generator 422 the timestamp of the user for which the retry period is being calculated.

In one embodiment, the difference between the timestamp being issued and the cutoff timestamp is rounded down to the nearest second and used as the retry period by retry period calculator 530. In another embodiment, a fraction, such as 0.5 or 0.75 of the difference is used as the retry period. In another embodiment, the difference is computed using one of the techniques described above, but then adjusted based on the trend of the capacity of the system or the trend of the difference between the cutoff timestamp and the system clock, which cutoff timestamp generator 530 retrieves from an operating system, not shown via a connection not shown. In such embodiment, retry period calculator 530 stores one or more of the past values of the capacity of the system or past values of the difference between the cutoff timestamp and the system clock and identifies a trend. Retry period calculator 530 adjusts the retry period higher if the trend is of the capacity of the system is decreasing or the trend of the difference between the system clock and the cutoff timestamp is increasing. Retry period calculator 530 adjusts the retry period lower if the trend of the capacity is increasing or the trend of the difference between the cutoff timestamp and the system clock is decreasing. If the trend is unchanged or indeterminant, the retry period is not adjusted in this fashion.

Because the retry period is calculated based on the timestamp of the user for whom the retry period is being calculated, users closer to the cutoff timestamp may be issued a retry period that is shorter than those being issued a timestamp initially.

In one embodiment, retry period calculator 530 only calculates a single retry period for all timestamps that will correspond to one 30 second range of timestamps in timestamp storage 520.

Referring now to FIG. 6, a method of providing server status and a cutoff timestamp is shown according to one embodiment of the present invention. One or more servers are monitored 610 as described above to determine their availability. This may be accomplished by sending one or more commands and waiting for acknowledgment of the commands sent, or waiting for the result of the command. The results of the monitoring are used to determine 612 the server status as described above. The server status is provided 614, for example in the form of the LSP status daemon file or in any other form.

The available system capacity is received or determined 616. The determination of the capacity of the system may be performed as described above, such as is described in the copending application or using any other method. A cutoff timestamp is calculated or identified, and then provided 618 as described above.

A determination is made 622 as to whether a sufficient time period has elapsed since the last time the server status or the cutoff timestamp was provided, or any other of the steps of FIG. 6 were performed. The determination may include comparing a system clock against a stored time of performance of such step of FIG. 6, such storage having been performed as part of that step. If a sufficient period of time has elapsed 622, the method continues at step 610. Otherwise, the method waits 624 and step 622 is performed again.

The method of FIG. 6 illustrates a sequence between two groups of steps: 610-614 and 616-620. In another embodiment, these two groups are performed in the reverse order (steps 616-620, then steps 610-614). In another embodiment, each group is performed independently of the other, with steps similar to step 622-624 performed after performance of each group, with the methods repeating at the first step of each group. In yet another embodiment, after one or both groups are performed, the method repeats from the first step of each group, and no determination or wait similar to steps 622-624 are performed following either or both groups.

Referring now to FIG. 7, a method of delaying access to a user requesting service from one or more servers is shown according to one embodiment of the present invention. A request is received 710. The request is identified to determine whether the request requires a log on 712. If the request does not require a log on, 712, the request is processed 714 and the method continues at step 710. Otherwise, the method continues at step 716.

One or more status indications of the server or servers are received 716 as described above. The status indication can be in the form of the LSP status daemon file or any other form that describes the status of one or more servers. If the status indications received in step 716 indicate that delaying access is not required 718 as described above, the request is processed 720, for example by sending it to the server or a server interface as described above, and the method continues at step 710. Otherwise, the method continues at step 722.

If a timestamp was not received 722 with the request, an applet, with or without a cookie, which may include a timestamp and a statically or variably calculated retry period, is generated and provided 728 to the user sending the request received in step 710 as described above. The timestamp and optionally the retry period is stored as part of step 730 for use in identifying the cutoff timestamp as described above.

If a timestamp was received with the request 722, a cutoff timestamp is received 724, having been generated as described herein. If the timestamp received with the request is not later than, or not later than or equal to the cutoff timestamp 726, the method continues at step 720. Otherwise, the method continues at step 728 in one embodiment.

In another embodiment, in place of continuing at step 728, a rejection is transmitted or no response to the request is transmitted or another form of response is transmitted to the device that sent the request that will cause the device to wait for another retry period and send the request again. In one such embodiment, the retry period may be updated in the response, so that the device which sent the request will wait for a different retry period than was used for the request received in step 710. The method then continues at step 710.

In one embodiment, if a log on request is processed, all subsequent requests from that user are processed without performing steps 718 and 720 and in another embodiment, subsequent requests also use steps 718 and 720.

Referring now to FIG. 9, a method of recording a numbers of users waiting for access to a portion of a web site is shown according to one embodiment of the present invention. A timestamp is received 910. If the timestamp received in step 910 corresponds to an express abandonment request, the number of express abandons is incremented 914 in the proper position of the table as described above and the number of users waiting is optionally decremented in one or two places as described above and the method continues at step 910.

If the timestamp received in step 910 is not an express abandonment request, a number of users waiting to access the website is incremented 916 and the method continues at step 910 for another request.

Referring now to FIG. 9B, a method of processing the numbers of users recorded as described in FIG. 9A is shown according to one embodiment of the present invention.

The first row of a table is selected and if the current time corresponds to an ending period, the entry in a column corresponding to the selected row is copied to another column, then cleared as described above and a new ending time is optionally calculated as described above 924. The next row is selected 926 and the method continues at step 922 using the row selected in step 926. If the time is not the ending time 922, the method continues at step 924

What is claimed is:

1. A method of processing a first request for web page, comprising:
   receiving the first request for the web page; and
   transmitting, to a device from which the first request was received, at least one command to send a second request for the web page, and a first timestamp.

2. The method of claim 1 wherein the transmitting step is responsive to an existence of a second timestamp received with the request.

3. The method of claim 2 comprising the additional steps of:
   identifying a third timestamp; and
   responsive to the second timestamp received with the request, processing the request for the web page responsive to the second timestamp and the third timestamp.

4. The method of claim 3 wherein the identifying the third timestamp step is responsive to a capacity of at least one selected from at least one server and a device coupled to the at least one server.

5. The method of claim 4 additionally comprising incrementing at least one of a plurality of counters responsive to the first request.

6. The method of claim 5 wherein each of the plurality of counters corresponds to a range of time different from the other plurality of counters.

7. The method of claim 6 wherein the identifying the third timestamp step is additionally responsive to at least one of the plurality of counters.

8. The method of claim 5 comprising the additional steps of:
receiving a notification of abandonment of at least one selected from the first request and the second request; and
decrementing at least one of the plurality of counters.

9. The method of claim 3 wherein the identifying the third timestamp step comprises sending a command to at least one selected from at least one server and a device coupled to the at least one server.

10. The method of claim 3 wherein the identifying the third timestamp step comprises building a file comprising a status of at least one selected from at least one server and at least one device coupled to the at least one server.

11. The method of claim 1, wherein the transmitting step is responsive to a type of the first request.

12. The method of claim 1, additionally comprising transmitting computer readable program code devices configured to cause a computer to send the second request responsive to the indicator transmitted.

13. The method of claim 1 wherein the computer readable program code devices configured to cause the computer to send the second request responsive to the indicator transmitted comprise at least one selected from a Javascript script and a Java applet.

14. A computer program product comprising a non-transitory computer useable medium having computer readable program code embodied therein for processing a first request for web page, the computer program product comprising:
computer readable program code devices configured to cause a computer to receive the first request for the web page; and
computer readable program code devices configured to cause a computer to transmit, to a device from which the first request was received, at least one command to send a second request for the web page, and a first timestamp.

15. The computer program product of claim 14 wherein the computer readable program code devices configured to cause a computer to transmit are responsive to an existence of a second timestamp received with the request.

16. The computer program product of claim 15 additionally comprising computer readable program code devices configured to cause a computer to:
identify a third timestamp; and
responsive to the second timestamp received with the request, process the request for the web page responsive to the third timestamp and the second timestamp.

17. The computer program product of claim 16 wherein the computer readable program code devices configured to cause a computer to identify the third timestamp are responsive to a capacity of at least one selected from at least one server and a device coupled to the at least one server.

18. The computer program product of claim 17 additionally comprising computer readable program code devices configured to cause a computer to increment at least one of a plurality of counters responsive to the first request.

19. The computer program product of claim 18 wherein each of the plurality of counters corresponds to a range of time different from the other plurality of counters.

20. The computer program product of claim 19 wherein the computer readable program code devices configured to cause a computer to identify the third timestamp are additionally responsive to at least one of the plurality of counters.

21. The computer program product of claim 18 additionally comprising:
computer readable program code devices configured to cause a computer to receive a notification of abandonment of at least one selected from the first request and the second request; and
computer readable program code devices configured to cause a computer to decrement at least one of the plurality of counters.

22. The computer program product of claim 16 wherein the computer readable program code devices configured to cause a computer to identify the third timestamp comprise sending a command to at least one selected from at least one server and a device coupled to the at least one server.

23. The computer program product of claim 16 wherein the computer readable program code devices configured to cause a computer to identify the third timestamp comprise computer readable program code devices configured to cause a computer to build a file comprising a status of at least one selected from at least one server and at least one device coupled to the at least one server.

24. The computer program product of claim 14, wherein the computer readable program code devices configured to cause a computer to transmit are responsive to a type of the first request.

25. The computer program product of claim 14, additionally comprising computer readable program code devices configured to cause a first computer to transmit computer readable program code devices configured to cause second computer to send the second request responsive to the indicator transmitted.

26. The computer program product of claim 14 wherein the computer readable program code devices configured to cause the computer to send the second request responsive to the indicator transmitted comprise at least one selected from a Javascript script and a Java applet.

27. An apparatus for processing a first request for a web page, the apparatus comprising:
a user request router having an input coupled to an apparatus input operatively coupled for receiving the first request, the user request router for providing at an output a signal responsive to the first request received at the user request router input; and
a cookie/applet generator having an input coupled to the user request router output for receiving the signal, the cookie/applet generator for providing, to a device from which the first request was received, via a first output coupled to an apparatus output, a first indicator of at least one time to send a second request for the web page.

28. The apparatus of claim 27, wherein the first request comprises a second indicator of time, and the user request router provides the signal at the user request router output responsive to the second indicator of time.

29. The apparatus of claim 28, wherein the cookie/applet generator provides at a second output a third indicator of time corresponding to the first indicator of time, the apparatus additionally comprising:
a strokecount storage for having an input coupled to the cookie/applet generator third output for receiving the third indicator of time, the strokecount storage for storing the third indicator of time and a set of fourth indicators of time and for providing the third indicator of time and the set of fourth indicators of time at an input/output; and a cutoff timestamp calculator having an input operatively coupled for receiving an indicator of capacity, the cutoff timestamp calculator for selecting and providing at an output a timestamp from the set of fourth indicators of time responsive to the capacity; and wherein the user request router additionally comprises a cutoff timestamp input coupled to the cutoff timestamp calculator output and the user request router provides the signal additionally responsive to the timestamp received at the cutoff timestamp input.

30. The apparatus of claim 27, wherein the cookie/applet generator additionally provides at the cookie/applet generator first output computer readable program code devices configured to cause a computer to send the second request responsive to the indicator.

31. The apparatus of claim 30 wherein the computer readable program code devices configured to cause the computer to send the second request responsive to the indicator transmitted comprise at least one selected from a Javascript script and a Java-applet.

* * * * *